(12) United States Patent
Jahnke et al.

(10) Patent No.: US 11,370,400 B2
(45) Date of Patent: Jun. 28, 2022

(54) BRAKING SYSTEM

(71) Applicant: Haldex Brake Products AB, Landskrona (SE)

(72) Inventors: Andreas Jahnke, Landskrona (SE); Carl Mellings, Lindley (GB)

(73) Assignee: Haldex Brake Products AB, Landskrona (SE)

(*) Notice: Subject to any disclaimer, the term of this patent is extended or adjusted under 35 U.S.C. 154(b) by 324 days.

(21) Appl. No.: 16/640,261

(22) PCT Filed: May 31, 2018

(86) PCT No.: PCT/EP2018/064390
§ 371 (c)(1),
(2) Date: Feb. 19, 2020

(87) PCT Pub. No.: WO2019/037911
PCT Pub. Date: Feb. 28, 2019

(65) Prior Publication Data
US 2020/0361429 A1 Nov. 19, 2020

(30) Foreign Application Priority Data
Aug. 25, 2017 (GB) ...................................... 1713715

(51) Int. Cl.
| B60T 7/20 | (2006.01) |
| B60R 16/023 | (2006.01) |
| B60T 8/17 | (2006.01) |
| B60T 13/66 | (2006.01) |
| H04L 12/40 | (2006.01) |

(52) U.S. Cl.
CPC .............. B60T 7/20 (2013.01); B60R 16/023 (2013.01); B60T 8/1708 (2013.01);
(Continued)

(58) Field of Classification Search
CPC ...... B60T 7/20; B60T 8/1708; B60T 2230/06; B60T 2270/406
See application file for complete search history.

(56) References Cited

U.S. PATENT DOCUMENTS 9,016,807 B1* 4/2015 Pieronek ................. B60T 8/171
 303/3
9,632,507 B1* 4/2017 Korn ........................ G08G 1/22
(Continued)

FOREIGN PATENT DOCUMENTS

CA 2841067 1/2013
EP 1577185 9/2005
(Continued)

OTHER PUBLICATIONS

PCT/EP2018/064390, Written Opinion of the International Searching Authority, 5 pages, dated Aug. 25, 2017.
(Continued)

*Primary Examiner* — Melanie Torres Williams
(74) *Attorney, Agent, or Firm* — Boyle Fredrickson S.C.

(57) ABSTRACT

A vehicle braking system comprising a first braking electronic control unit (ECU) which is operable to control the operation of a first set of vehicle brakes, a second braking electronic control unit (ECU) which is operable to control the operation of a second set of vehicle brakes, and a first connection between the first and second braking ECUs by means of which an electrical braking control signal may be transmitted between the first and second braking ECUs, the first braking ECU being provided with a first wireless signal receiver by means of which data from a further vehicle concerning the braking of the further vehicle may be received, wherein the second braking ECU is provided with a second wireless signal receiver by means of which data from a further vehicle concerning the braking of the further vehicle may be received, and is programmed to, in the event of a failure of the first wireless signal receiver, transmit either the data received from the further vehicle or information or instructions based on the data received from the further vehicle, to the first braking ECU via the first connection.

13 Claims, 2 Drawing Sheets

Figure 1:
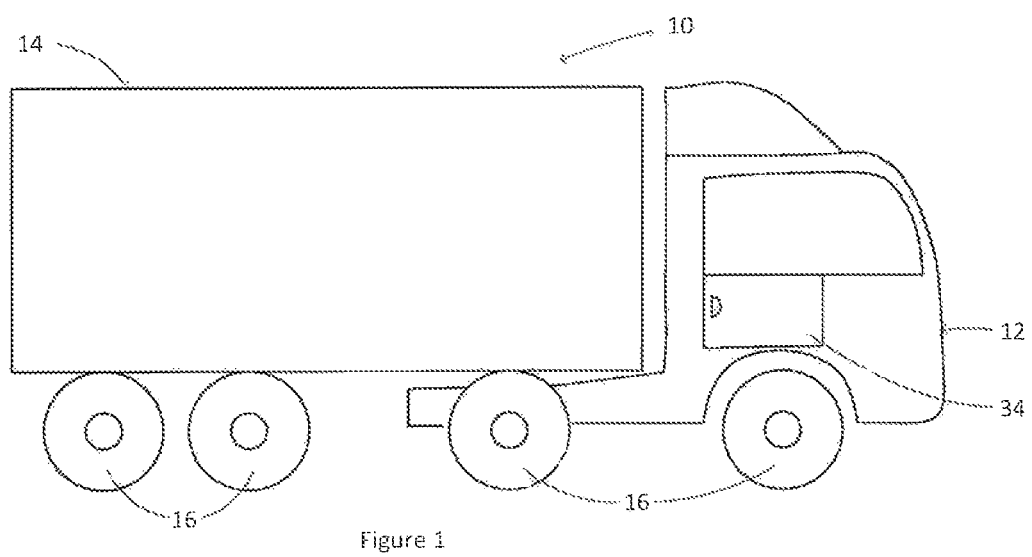

(52) U.S. Cl.
    CPC ............ *B60T 13/662* (2013.01); *H04L 12/40*
        (2013.01); *B60T 2230/06* (2013.01); *B60T 2270/402* (2013.01); *H04L 2012/40215* (2013.01); *H04L 2012/40273* (2013.01)

(56) References Cited

U.S. PATENT DOCUMENTS

| | | |
|---|---|---|
| 2010/0256835 A1 | 10/2010 | Mudalige |
| 2012/0323406 A1 | 12/2012 | Yamashiro |
| 2016/0366336 A1 | 12/2016 | Kuehnle et al. |
| 2017/0166219 A1 | 6/2017 | Jammoussi et al. |
| 2017/0232943 A1* | 8/2017 | Brooks ................... B61C 17/12 701/19 |

FOREIGN PATENT DOCUMENTS

| | | |
|---|---|---|
| EP | 2402924 | 1/2012 |
| EP | 2878501 | 6/2015 |
| SE | 201550387 | 10/2016 |
| WO | 2017035516 | 3/2017 |
| WO | 2017/210200 | 12/2017 |

OTHER PUBLICATIONS

PCT/EP2018/064390, International Search Report, 4 pages, dated Aug. 25, 2017.
GB1713715.9, Search Report, 1 page, dated Feb. 16, 2018.

* cited by examiner

BRAKING SYSTEM

DESCRIPTION OF INVENTION

The invention relates to a braking system in particular for use in a combination vehicle comprising a tractor and a trailer or semi-trailer.

It is known for commercial vehicles, in particular heavy goods vehicles comprising a towing vehicle (hereinafter referred to as a truck) and a trailer or semi-trailer, to travel in a group (generally known as a platoon), following closely behind the vehicle in front. As described in WO 2017/035516, US20100256835, SE201550387, and CA2841067, for example, it is known to provide for communication between the vehicles in the platoon, so that controllers on each vehicle may take into account data or other information received from the other vehicles in the platoon when controlling operation of the vehicle on which the controllers are mounted.

For example, it is known for such combination vehicles to be provided with an electronic braking system in which, in response to demand for braking (either derived from driver demand or required by an automatic stability control system), an electrical braking control signal is transmitted from a braking electronic control unit (ECU) mounted on the truck to a braking ECU on the trailer, the truck braking ECU controlling operation of the brakes on the truck, and the trailer braking ECU controlling operation of the brakes on the trailer. Typically, this electrical braking control signal is transmitted via a CAN bus which extends from the tractor braking ECU to the trailer braking ECU. It is also known to provide the truck braking ECU with a wireless transmitter and receiver which transmits information concerning the braking of the vehicle to the wireless receiver of other vehicles in the platoon, and receives information concerning the braking of another vehicle in the platoon. So, for example, if the driver of the lead vehicle in the platoon brakes, the truck braking issues a control signal to apply the truck brakes, transmits an electrical braking control signal to the trailer braking ECU which issues a control signal to apply the trailer brakes, and transmits information concerning the braking event to the truck braking ECUs of the other vehicles in the platoon. The other vehicles in the platoon therefore have advance warning that the lead vehicle is about to brake, and can respond by initiating braking of the vehicle on which it is mounted in advance of the braking of the lead vehicle taking effect. This may reduce the risk of vehicles in a platoon colliding when one brakes suddenly.

It is an object of the present invention to provide a vehicle braking system which may improve the safety of vehicles in a platoon.

According to a first aspect of the invention we provide a vehicle braking system comprising a first braking electronic control unit (ECU) which is operable to control the operation of a first set of vehicle brakes, a second braking electronic control unit (ECU) which is operable to control the operation of a second set of vehicle brakes, and a first connection between the first and second braking ECUs by means of which an electrical braking control signal may be transmitted between the first and second braking ECUs, the first braking ECU being provided with a first wireless signal receiver by means of which data from a further vehicle concerning the braking of the further vehicle may be received, wherein the second braking ECU is provided with a second wireless signal receiver by means of which data from a further vehicle concerning the braking of the further vehicle may be received, and is programmed to, in the event of a failure of the first wireless signal receiver, transmit either the data received from the further vehicle or information or instructions based on the data received from the further vehicle, to the first braking ECU via the first connection.

The first braking ECU may be programmed to generate an electrical control signal depending on data received from the further vehicle.

The first braking ECU may be programmed to operate the first set of brakes to apply a braking force to the vehicle if the data received from the further vehicle comprises notification that brakes of the further vehicle are being applied. The second braking ECU may be programmed to operate the second set of brakes to apply a braking force to the vehicle if the data received from the further vehicle comprises notification that brakes of the further vehicle are being applied. The first braking ECU may be programmed to send, via the first connection, an electrical braking control signal to the second braking ECU to cause the second braking ECU to operate the second set of brakes to apply a braking force to the vehicle, if the data received from the further vehicle comprises notification that brakes of the further vehicle are being or have been applied.

The second braking ECU may be programmed to relay, via the first connection, the data received from the further vehicle to the first braking ECU.

The second braking ECU may be programmed to operate the second set of brakes to apply a braking force to the vehicle if the data it receives from the further vehicle via the second wireless signal receiver comprises notification that brakes of the further vehicle are being or have been applied.

The second braking ECU may be programmed to send, via the first connection, an electrical braking control signal to the first braking ECU to cause the first braking ECU to operate the first set of brakes to apply a braking force to the vehicle, if the data it receives from the further vehicle via the second wireless signal receiver comprises notification that brakes of the further vehicle are being or have been applied.

The first braking ECU may also be provided with a first wireless signal transmitter which is operable to transmit to a further vehicle data concerning braking initiated by the first and/or second braking ECU.

The second braking ECU may also be provided with a second wireless signal transmitter, and is programmed to transmit to a further vehicle data concerning braking initiated by the first and/or second braking ECU, in the event of failure of the first wireless signal transmitter.

In one embodiment, the first connection is a hard-wired connection. The first connection may, for example, be a CAN data bus.

In one embodiment, the first wireless receiver is programmed to send a status signal to the second wireless signal receiver at a predetermined frequency, and the second braking ECU is programmed to act on the failure of the first wireless signal receiver if no status signal is received within a period of time set according to the predetermined frequency.

According to a second aspect of the invention we provide a vehicle comprising a tractor and a trailer (which term should be taken to include either a full trailer or a semi-trailer), and a braking system according to the first aspect of the invention, the first braking ECU and first set of vehicle brakes being mounted on the tractor and the second braking ECU and second set of vehicle brakes being mounted on the trailer.

Figure 2:
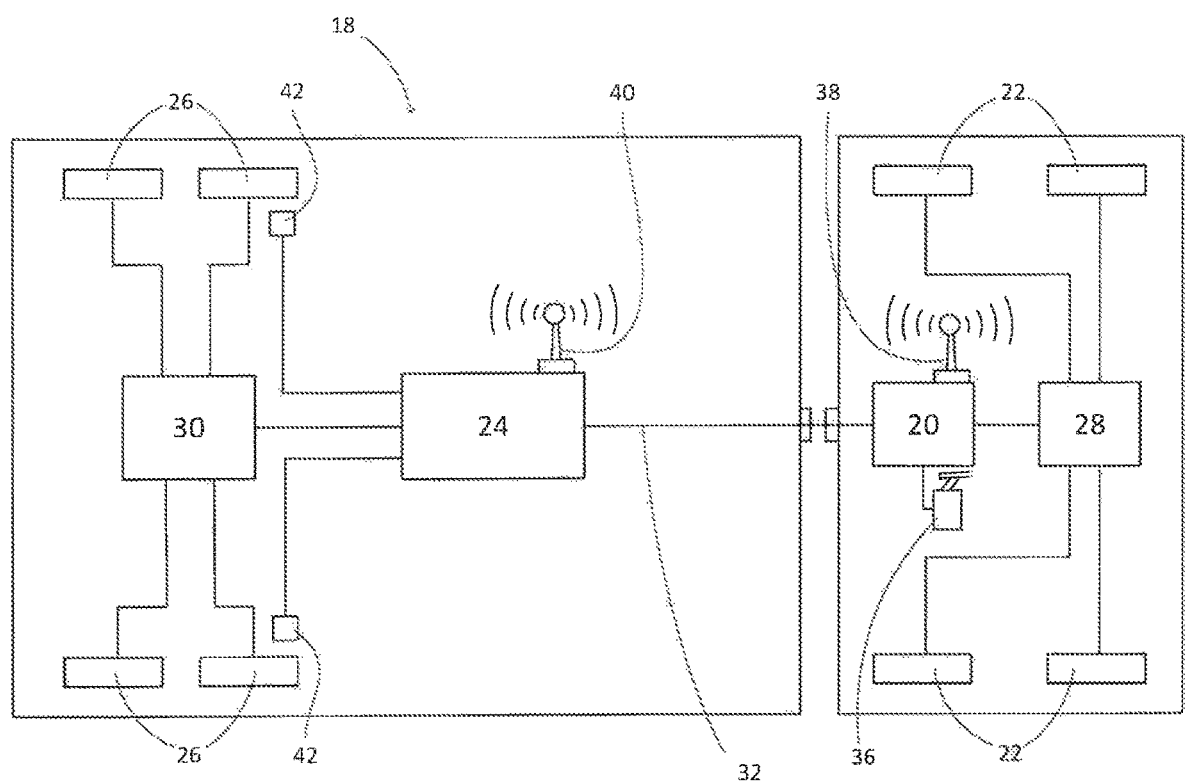

An embodiment of the invention will now be described with reference to the following drawings:

FIG. 1 is a schematic illustration of a vehicle according to the second aspect of the invention, and FIG. 2 is a schematic plan view of the vehicle illustrated in FIG. 1 and the braking system according to the first aspect of the invention.

Referring now to FIG. 1, there is shown a vehicle 10 comprising a tractor 12 (hereinafter referred to as the truck 12), and a semi-trailer 14. It will be appreciated, however, that the vehicle could equally comprise a truck and a full trailer and so, hereinafter, the term "trailer" will be used to refer to a semitrailer or trailer. Each of the truck 12 and trailer 14 are supported on a plurality of ground engaging wheels. In the example illustrated in FIG. 1, both the truck 12 and trailer 14 have two pairs of wheels 16 mounted on two axes. It will be appreciated, however, that the invention could equally be applied to vehicles with a greater or fewer number of wheels and axles.

The vehicle 10 is provided with a braking system 18 which is illustrated schematically in FIG. 2. The braking system 18 comprises a first braking electronic control unit (ECU) 20 which is operable to control the operation of a first set of vehicle brakes 22, a second braking electronic control unit (ECU) 24 which is operable to control the operation of a second set of vehicle brakes 26.

In this example, the vehicle brakes 22, 26 are operated to apply a braking force to the wheels 16 by means of fluid pressure operated actuators, there being an electrically operated valve assembly 28, 30, hereinafter referred to as a modulator, provided to control the flow of pressurised fluid to the brake actuators.

In the embodiment of the invention illustrated in FIG. 2, the first braking ECU 20 and first set of brakes 22 are mounted on the truck 12, and the second braking ECU 24 and second set of brakes 26 are mounted on the trailer 14. Each of the truck 12 and trailer 14 is shown as having a single modulator—a first modulator 28 which is mounted on the truck 12 and a second modulator 30 which is mounted on the trailer 14. It will be appreciated that the invention could equally be applied to other configurations of braking system. For example, the two modulators may be provided on one or both of the truck 12 or trailer 14, one of the two modulators controlling flow of pressurised fluid to the brake actuators associated with the wheels on one of the axles, and the other controlling flow of pressurised fluid to wheels on the other axle. Alternatively, a separate modulator may be provided for the brake actuator associated with each of the wheels.

Typically the pressurised fluid used to operate the brake actuators is compressed air.

The braking system further comprises a first connection 32 between the first braking ECU 20 and the second braking ECU 24 by means of which an electrical braking control signal may be transmitted between the first and second braking ECUs 20, 24. Typically, the first connection 32 comprises a CAN data bus, but it may comprise any other suitable form of electrical or electronic connection.

Also mounted on the truck 12, typically provided in a driver's cab 34, is a braking demand input device 36 which may be operated to indicate that braking of the vehicle is required. This is typically a foot operated brake pedal. The braking demand input device 36 is connected to the first braking ECU 20, and is configured so that, when operated, it sends a braking demand signal to the first braking ECU 20 indicating the level of braking demanded by the driver. This may be an electrical or electronic braking demand signal, or a fluid pressure braking demand signal. In the latter case, the first braking ECU 20 is provided with a pressure transducer to transform the fluid pressure braking demand signal into an electrical or electronic braking demand signal.

The first braking ECU 20 is programmed to, on receipt of a braking demand signal from the braking demand input device 36, to operate the first set of brakes 22 to apply a level of braking to the truck 12 appropriate to meet the level of braking demanded by the driver. In this embodiment, this is achieved by the first braking ECU 20 sending an electrical control signal to the first modulator 28, which, in turn, controls flow of pressurised fluid to the actuators on the truck 12.

The first braking ECU 20 is also programmed, on receipt of a braking demand signal from the braking demand input device 36, to send an appropriate electrical braking control signal to the second braking ECU 24 via the first connection 32. The second braking ECU 24 is programmed to, on receipt of such a signal, operate the second set of brakes 26 to apply a level of braking to the trailer appropriate to meet the level of braking demanded by the driver. In this embodiment, this is achieved by the second braking ECU 24 sending an electrical control signal to the second modulator 30, which, in turn, controls flow of pressurised fluid to the actuators on the trailer 14.

Typically the electrical braking control signal merely comprises an indication of the level of braking demanded. The second braking ECU 24 is connected to and receives data from sensors on the trailer 42. These typically include wheel speed sensors and a load sensor which provides a load signal indicating the degree of loading of the trailer. The second braking ECU 24 is typically programmed to use data from at least one of these sensors 42 to determine pressure of fluid required to be supplied to the brake actuators to apply the brakes with sufficient force to achieve the level of braking demanded.

The vehicle may be provided with a stability control system, and the first and or second braking ECUs 20, 24 may also be programmed to apply the brakes automatically, that is in the absence of driver demand for braking, if an automatic stability control system requires it. In this case, typically the first and/or second braking ECUs 20, 24 are programmed to determine if the vehicle is unstable, or might rollover, based on signals from sensors 42 such as a yaw rate sensor, lateral acceleration sensor or wheel speed sensors. If it is determined that the vehicle is unstable, or might rollover, the first and or second braking ECUs 20, 24 may be programmed to carry out a stability control braking intervention which comprises the automatic application of at least some of the vehicle brakes even if there is no driver demand for braking. Such sensors may either be arranged separately, and/or may be incorporated into other devices, such as the ECUs 20, 24. The driver demand may be sent from an automatic vehicle control system of an autonomous vehicle.

All the features of the braking system 18 mentioned above are all currently standard in the braking systems of heavy goods vehicles, and as such, are well known to those of skill in the art.

In a braking system according to the first aspect of the invention, the first braking ECU 20 is provided with a first wireless signal receiver 38 by means of which data from a further vehicle concerning the braking of the further vehicle may be received. The first braking ECU 20 is programmed to generate an electrical control signal depending on the data received from the further vehicle. The data received from the further vehicle could merely contain a notification that the further vehicle is braking, but it could also contain information concerning the level of braking demanded.

The first braking ECU 20 is programmed to operate the first set of brakes 22 to apply a braking force to the vehicle 10 on being notified that the further vehicle is braking. As such, the electrical control signal is transmitted to the first modulator 28 so that the first modulator 28 allows flow of pressurised fluid to the actuators on the truck 12.

In this embodiment, the electrical control signal also comprises an electrical braking control signal which is transmitted to the second braking ECU 24 via the first connection 32 and is processed and acted on by the second ECU 24 in the same way as described above in relation to an electrical braking control signal generated as a result of driver demand for braking.

Advantageously, the signal received from the further vehicle comprises an indication of the level of braking being applied to the further vehicle (either as a result of driver demanded braking or automatic braking in a stability control intervention), and, on receipt of such a signal, the first braking ECU 20 is programmed to operate the first set of brakes 22 to apply an appropriate level of braking to the truck 12, by transmitting the said electrical control signal to the first modulator 28 to control flow of pressurised fluid to the actuators on the truck 12. The first braking ECU 20 is also, in this example, programmed to transmit an appropriate electrical braking control signal to the second braking ECU 24 to apply the second set of brakes 26 to apply an appropriate level of braking to the trailer 14 depending on the data received from the further vehicle. As above in relation to the truck 12, the second ECU 24 transmits a control sign to the second modulator 30, which, in turn, controls flow of pressurised fluid to the actuators on the trailer 14 to apply the second set of brakes 26.

By virtue of this arrangement if the vehicle 10 and the further vehicle are travelling together in a platoon, with the further vehicle ahead of the vehicle 10, and the further vehicle brakes, a signal indicating that the further vehicle has braked is received by the first wireless signal receiver 38. The first braking ECU 20 reacts to that signal by applying the first set of brakes 22 and sending appropriate instructions to the second braking ECU 24 to apply the second set of brakes 26. The two vehicles may thus slow down, or come to a stop generally simultaneously, thus reducing the risk of the vehicle 10 running into the back of the further vehicle ahead.

In this embodiment, the first wireless signal receiver 38 is also a wireless signal transmitter which is operable to transmit to a further vehicle data concerning braking initiated by the first braking ECU 22. The data transmitted could merely contain a notification that the vehicle 10 is being braked or has been braked, but could also contain information concerning the level of braking.

The second braking ECU 24 is provided with a second wireless signal receiver 40 by means of which data from a further vehicle concerning the braking of the further vehicle may be received, and is programmed to, in the event of a failure of the first wireless signal receiver 38, transmit either the data received from the further vehicle or information or instructions based on the data received from the further vehicle, to the first braking ECU 22 via the first connection 32, The provision of the second wireless signal receiver 40 provides redundancy and means that the braking system 18 may react to the braking of the further vehicle even in the event of the failure of the first wireless receiver 38.

As indicated above, advantageously, the data received from the further vehicle comprises an indication of the level of braking being applied to the further vehicle (either as a result of driver demanded braking or automatic braking in a stability control intervention).

The second braking ECU 24 may simply relay the data received from the further vehicle to the first braking ECU 20, and the first braking ECU 20 may be programmed to react to the data received from the second braking ECU 24 via the first connection 32 as described above in relation to data received from the further vehicle via the wireless signal receiver 38. In this case, the first braking ECU 20 is programmed to, on receipt of the said data, operate the first set of brakes 22 to apply an appropriate level of braking to the truck 12, by transmitting the said electrical control signal to the first modulator 28 to control flow of pressurised fluid to the actuators on the truck 12, and to transmit an appropriate electrical braking control signal to the second braking ECU 24 to apply the second set of brakes 26 to apply an appropriate level of braking to the trailer 14 depending on the data received from the further vehicle.

This need not be the case however, and the second braking ECU 24 might be programmed to take on the role of the first braking ECU 24, and react to receipt of data from the further vehicle in the same way as the first braking ECU 20 is programmed to react when it receives data from a further vehicle via the wireless signal receiver 38.

In this case, on receipt of such a signal, the second braking ECU 24 is programmed to operate the second set of brakes 26 to apply an appropriate level of braking to the trailer 14, by transmitting an electrical control signal to the second modulator 30 to control flow of pressurised fluid to the actuators on the trailer 14, and also to transmit an electrical braking control signal to the first braking ECU 24 to apply the first set of brakes 22 to apply an appropriate level of braking to the truck 12 depending on the data received from the further vehicle.

In this embodiment, as the first braking ECU 20 is provided with both a wireless signal receiver, and transmitter 38, it may be programmed to transmit to the second wireless signal receiver 40, at periodic intervals, a status signal indicating that it is transmitting and receiving wireless signals. The first braking ECU 20 may be programmed to cease transmitting this status signal in the event that the first wireless signal receiver fails. The second braking ECU 24 may check for receipt of the status signal from the first braking ECU 20, so the second braking ECU 24 is therefore alerted to the failure of the first wireless signal receiver and/or transmitter by a failure to receive a status signal from the first wireless signal transmitter 38 constantly or within a predetermined period of time. For example, the first braking ECU 20 may be programmed to transmit a constant status, and the second braking ECU 24 may be programmed to take over acting on the signal from a further vehicle if no status signal is received from the first braking ECU 20. The first braking ECU 20 may alternatively be programmed to transmit a status signal every 0.01 to 1.00 seconds, such time period being designated x, and the second braking ECU 24 may in such case be programmed to take over acting on the signal from a further vehicle if no status signal is received from the first braking ECU 20 within a 0.01 to 1.00 s period, said second time period y being slightly longer than the period between the status signals being sent out by the first ECU 20. The time periods x and y are typically predetermined, and may be set according to certain rules.

In this embodiment, the second braking ECU 24 is provided with a second wireless signal transmitter 40, and is programmed to transmit to a further vehicle data concerning braking initiated by the first and/or second braking ECU 20, 24, in the event of failure of the first wireless signal transmitter 38.

It will be appreciated that whilst the invention is described in conjunction with a conventional braking system, where braking is initiated either as a result of driver demand for braking or as a result of a stability control system determining that an automatic braking intervention is required, the invention could equally be applied to autonomous vehicles, in which the need for braking is determined by a computer system in the normal course of driving the vehicle (rather than in order to deal with a possible vehicle instability). In this case, it will be appreciated that the invention will operate in exactly the same way as described above, other than the way in which braking is initiated.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A vehicle braking system comprising a first braking electronic control unit (ECU) which is operable to control the operation of a first set of vehicle brakes, a second braking electronic control unit (ECU) which is operable to control the operation of a second set of vehicle brakes, and a first connection between the first and second braking ECUs by means of which an electrical braking control signal may be transmitted between the first and second braking ECUs, the first braking ECU being provided with a first wireless signal receiver by means of which data from a further vehicle concerning the braking of the further vehicle may be received, wherein the second braking ECU is provided with a second wireless signal receiver by means of which data from a further vehicle concerning the braking of the further vehicle may be received, and is programmed to, in the event of a failure of the first wireless signal receiver, transmit either the data received from the further vehicle or information or instructions based on the data received from the further vehicle, to the first braking ECU via the first connection.

2. A vehicle braking system according to claim 1 wherein the first braking ECU is programmed to generate an electrical control signal dependent on data received from the further vehicle.

3. A vehicle braking system according to claim 2 wherein the first braking ECU is programmed to operate the first set of brakes to apply a braking force to the vehicle if the data received from the further vehicle comprises notification that brakes of the further vehicle are being applied.

4. A vehicle braking system according to claim 1 wherein the first braking ECU is programmed to send, via the first connection, an electrical braking control signal to the second braking ECU to cause the second braking ECU to operate the second set of brakes to apply a braking force to the vehicle, if the data received from the further vehicle comprises notification that brakes of the further vehicle are being or have been applied.

5. A vehicle braking system according to claim 1 wherein the second braking ECU is programmed to relay, via the first connection, the data received from the further vehicle to the first braking ECU.

6. A vehicle braking system according to claim 1 wherein the second braking ECU is programmed to operate the second set of brakes to apply a braking force to the vehicle if the data it receives from the further vehicle via the second wireless signal receiver comprises notification that brakes of the further vehicle are being or have been applied.

7. A vehicle braking system according to claim 1 wherein the second braking ECU is programmed to send, via the first connection, an electrical braking control signal to the first braking ECU to cause the first braking ECU to operate the first set of brakes to apply a braking force to the vehicle, if the data it receives from the further vehicle via the second wireless signal receiver comprises notification that brakes of the further vehicle are being or have been applied.

8. A vehicle braking system according to claim 1 wherein the first braking ECU is further provided with a first wireless signal transmitter and is programmed to use the first wireless signal transmitter to transmit to a further vehicle data concerning braking initiated by the first and/or second braking ECU.

9. A vehicle braking system according to claim 1 wherein the second braking ECU is further provided with a second wireless signal transmitter, and is programmed to use the second wireless signal transmitter to transmit to a further vehicle data concerning braking initiated by the first and/or second braking ECU, in the event of failure of the first wireless signal transmitter.

10. A vehicle braking system according to claim 1 wherein the first connection is a hard-wired connection.

11. A vehicle braking system according to claim 10 wherein the first connection is a CAN data bus.

12. A vehicle braking system according to claim 1 wherein the first wireless receiver is programmed to send a status signal to the second wireless signal receiver at a predetermined frequency, and the second braking ECU is programmed to act on the failure of the first wireless signal receiver if no status signal is received within a period of time set according to the predetermined frequency.

13. A vehicle comprising a tractor and a trailer, and a braking system according to claim 1 wherein the first braking ECU and first set of vehicle brakes are mounted on the tractor and the second braking ECU and second set of vehicle brakes are mounted on the trailer.

* * * * *